United States Patent

Kagaya et al.

Patent Number: 5,119,471
Date of Patent: Jun. 2, 1992

[54] CONTROL APPARATUS OF HIGH SPEED/HIGH QUALITY PRINTER

[75] Inventors: Yoshihisa Kagaya; Kyoichi Fujioka, both of Tokyo, Japan

[73] Assignee: Oki Electric Industry Co., Ltd., Tokyo, Japan

[21] Appl. No.: 600,827

[22] Filed: Oct. 22, 1990

[30] Foreign Application Priority Data

Oct. 24, 1989 [JP] Japan ................................. 1-274980

[51] Int. Cl.⁵ .......................................... G06K 15/00
[52] U.S. Cl. ..................................... 395/110; 395/101; 340/735
[58] Field of Search ............... 395/101, 110, 112, 115; 340/790, 794, 798, 799, 801, 735; 346/154; 358/470; 400/61, 50-52, 65, 69

[56] References Cited

U.S. PATENT DOCUMENTS 4,879,666 11/1989 Kembo .......................... 395/110
5,040,129 8/1981 Nishiyama ........................ 395/110

FOREIGN PATENT DOCUMENTS 187558 9/1985 Japan .

*Primary Examiner*—Arthur G. Evans
*Attorney, Agent, or Firm*—Spencer, Frank & Schneider

[57] ABSTRACT

A control apparatus of a high speed/high quality printer includes a character data buffer for storing character data which needs a modification processing to provide a high quality of character, a dot pattern data memory for storing dot pattern data subjected to the modification processing, and a receiving processor for providing such a processing that it is determined whether or not character data, received from a host, is the character data which needs the modification processing, and if necessary one, the received character data is stored in the character data buffer prior to a printing processing. The apparatus further includes a printing processor for print-processing the data stored in the dot pattern data memory, and a data processor for providing such a processing that during an idle time period of the processing by the printing processor, the character data stored in the character data buffer is subjected to the modification processing, and the thus processed data is tored in the dot pattern data memory.

8 Claims, 6 Drawing Sheets

1/360 INCH

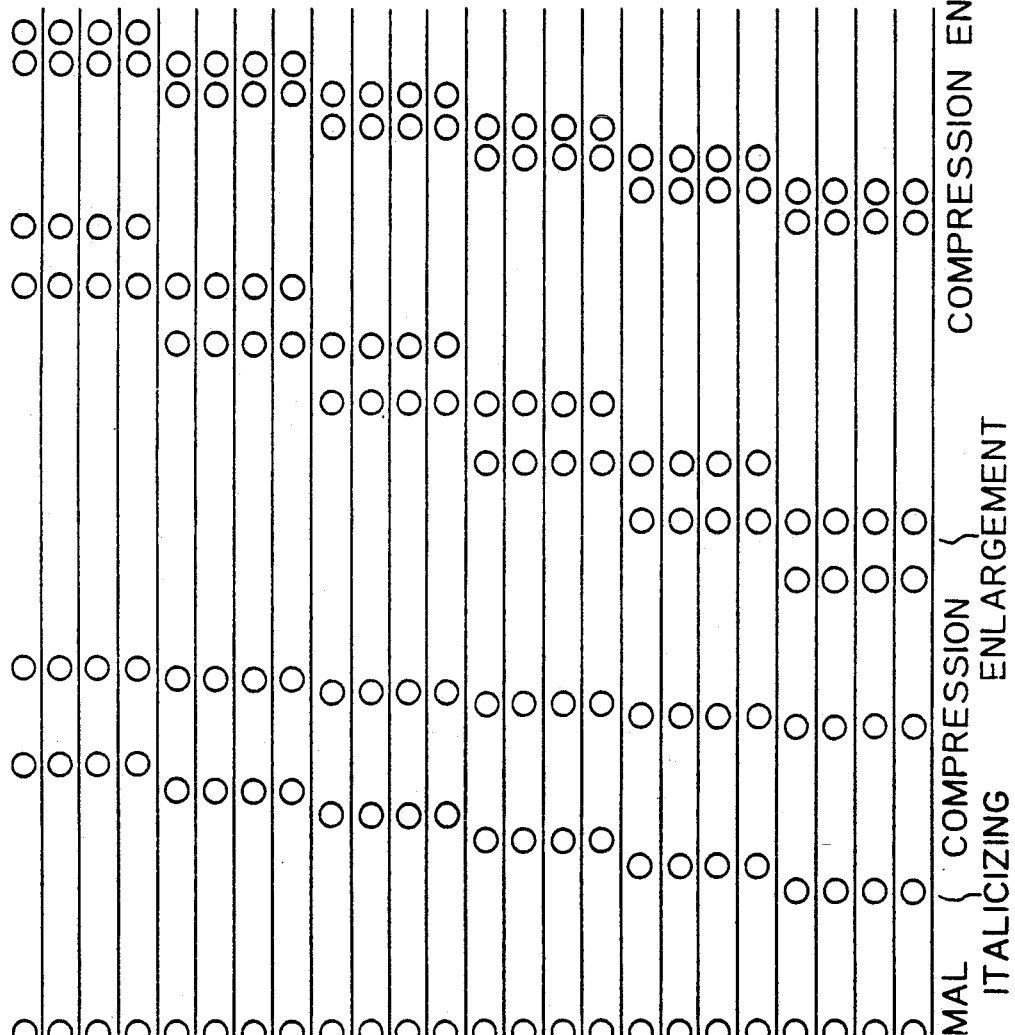

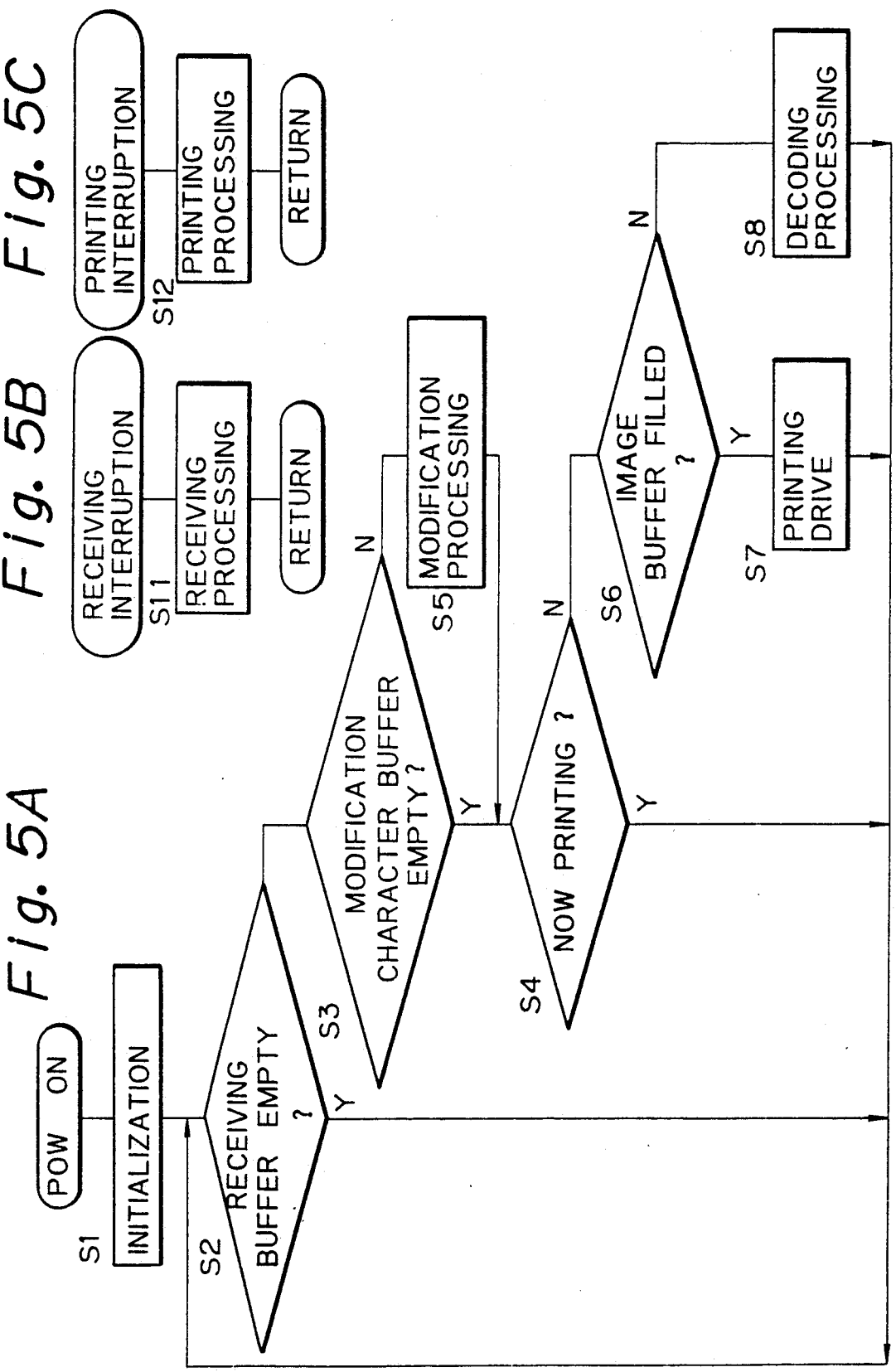

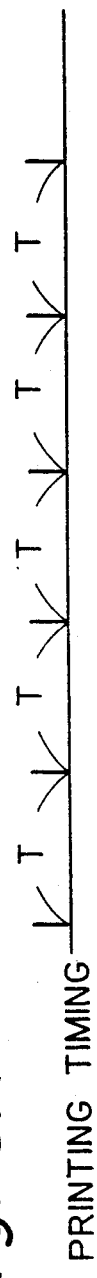
Fig. 6A  PRINTING TIMING
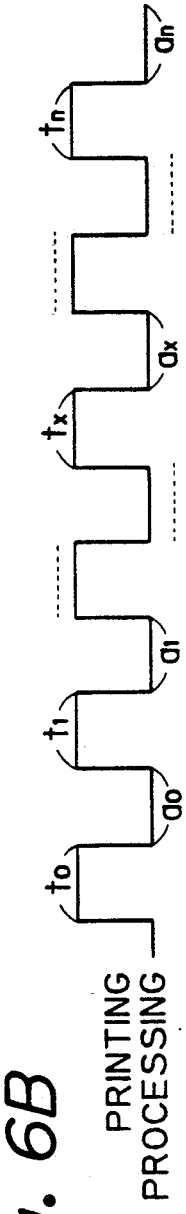
Fig. 6B  PRINTING PROCESSING

CONTROL APPARATUS OF HIGH SPEED/HIGH QUALITY PRINTER

BACKGROUND OF THE INVENTION

1. Field of the Invention

The present invention relates to a control apparatus of a high speed/high quality printer, and more particularly to a control apparatus for controlling a printing of characters or the like with dot patterns modified in the high speed/high quality printer.

2. Description of the Prior Art

Generally, in a printer used in a computer and so on, there is occasionally performed a modification such as an enlargement and italicization of a letter or character to a dot pattern of the letter or character to be printed. Such a modification is performed, for example, in a case where a partial phrase or word of a sentense is desired to be emphasized in expression. For example, Japanese patent laid-open publication No. 187558/1985 teaches a method of modifying a letter font in which a standard font corresponding to a dot pattern of a letter is prepared and when data associated with a desired font of the letter to be printed is provided it is compared with the standard font data of the letter to be in turn modified on the basis of the comparison.

FIG. 2 is a diagram used for the explanation of data flow in a conventional control apparatus of the printer. The control apparatus shown in FIG. 2 is provided with a receiving buffer 1, CG (Character Generator) memory 3 and an image buffer 5. The receiving buffer 1 comprises RAM (Random Access Memory) etc., and temporarily stores data received from a host apparatus. CG memory 3 stores dot pattern data representing a character to be printed. The image buffer 5 comprises RAM etc., and temporarily stores a unit quantity of data of dot pattern to be printed.

In a receiving processing P1a, character data corresponding to a character to be printed is received from a host apparatus, and stored in the receiving buffer 1. In a decoding modification processing P3a, a decoding of the character data is performed, and the associated dot pattern data is taken out from CG memory 3.

Thereafter, it is determined whether it is necessary for the dot pattern data to be subjected to a modification processing, and if necessary, the modification processing is performed. As an example of such a modification processing, there is the processing of the enlargement, the italicization and so on as mentioned before.

FIGS. 3A-3C are diagrams used for the explanation of a procedure of the enlargement of a character, respectively. FIG. 3A is a view showing an example of a dot pattern which represents a part of some character. Now let's consider this dot pattern is to be enlarged twice in a holizontal direction in the figure.

First, as shown in FIG. 3B, on the basis of OR operation on the adjacent dots in a holizontal direction there are provided dots at positions extended half dot on the left and right sides, respectively. As a result, one dot in FIG. 3A becomes three dots mutually overlapped on the left and right sides. In printing, since there is no overlapping of the dots, the central dots are removed, respectively, and the enlarged figure as shown in FIG. 3C will be printed.

FIG. 4 is a diagram used for the explanation of a procedure of the italicization of a character or letter. A letter shown in FIG. 4 shows a length of vertical straight line. In order to provide the italicization of this segment of a character, for instance, the dots aligned in a vertical direction are shifted in order on the basis of unit of blocks each comprising four dots in the right direction in the figure by a mutually different predetermined length. It is possible to compress the thus italicized segment in the left and right directions. In a case where the italicized segment is enlarged, further blocks each comprising four dots are added to the associated blocks on the right side, respectively. Further, it is possible to compress the thus enlarged italic segment of a character.

There is a problem with this type of apparatus as mentioned above however. Recently, there are performed not only reletively simpler modifications as shown in FIGS. 3A-3C and FIG. 4 as mentioned above, but also a more sophisticated modification, since a user tends to strongly require a higher quality of character printing. For example, a character to which the modification processings as shown in FIGS. 3A-3C and FIG. 4 have been performed is required to be subject to a smoothing processing to be smoothed in the contour thereof to be improved in quality, or readability.

Such a smoothing processing is complicated and takes much more time for the processing. Thus, there is such a problem that a processing ability is extremely degraded with a conventional scheme in which the modification processing is first performed immediately before printing.

SUMMARY OF THE INVENTION

In view of the foregoing, the present invention has been made. It is therefore an object of the present invention to provide a control apparatus of a high speed/high quality printer capable of preventing a processing ability from being degraded even in a case where a modification processing, which is complicated and takes much time for the modification, is performed.

In accordance with a preferred embodiment, there is disclosed a control apparatus of a high speed/high quality printer comprising a character data buffer for storing character data which needs a modification processing to provide a high quality of character, dot pattern data memory means for storing dot pattern data subjected to the modification processing, receiving processing means for providing such a processing that it is determined whether received character data is the character data which needs the modification processing, and if necessary one, the received character data is stored in the character data buffer prior to a printing processing, printing processing means for print-processing the data stored in the dot pattern data memory means, and data processing means for providing such a processing that during an idle period of time of the processing by the printing processing means, the character data stored in the character data buffer is processed for the modification or a development, and the thus processed data is stored in the dot pattern data memory means.

In accordance with one embodiment of the invention, receiving processing means makes determination as to whether received character data needs the modification processing, and if determined necessary, the received character data is stored in character data buffer prior to a printing processing, and the modification processing is performed utilizing an idle time of the processing by printing processing means. This feature makes it possible to prepare at earlier time dot pattern data necessary for printing. Thus, it is possible to improve a printing capability of the printer.

BRIEF DESCRIPTION OF THE DRAWINGS

The objects and features of the present invention will become more apparent from the consideration of the following detailed description taken in conjunction with the accompanying drawings in which:

FIG. 4 is a diagram used for the explanation of a procedure of the italicization of a character or letter;

FIGS. 5A, 5B and 5C are flow charts used for the explanation of a procedure of the printing in the control apparatus of the printer according to the present invention; and FIGS. 6A and 6B show a timing relation between a printing and a printing processing.

DESCRIPTION OF THE PREFERRED EMBODIMENT

Figure 1:
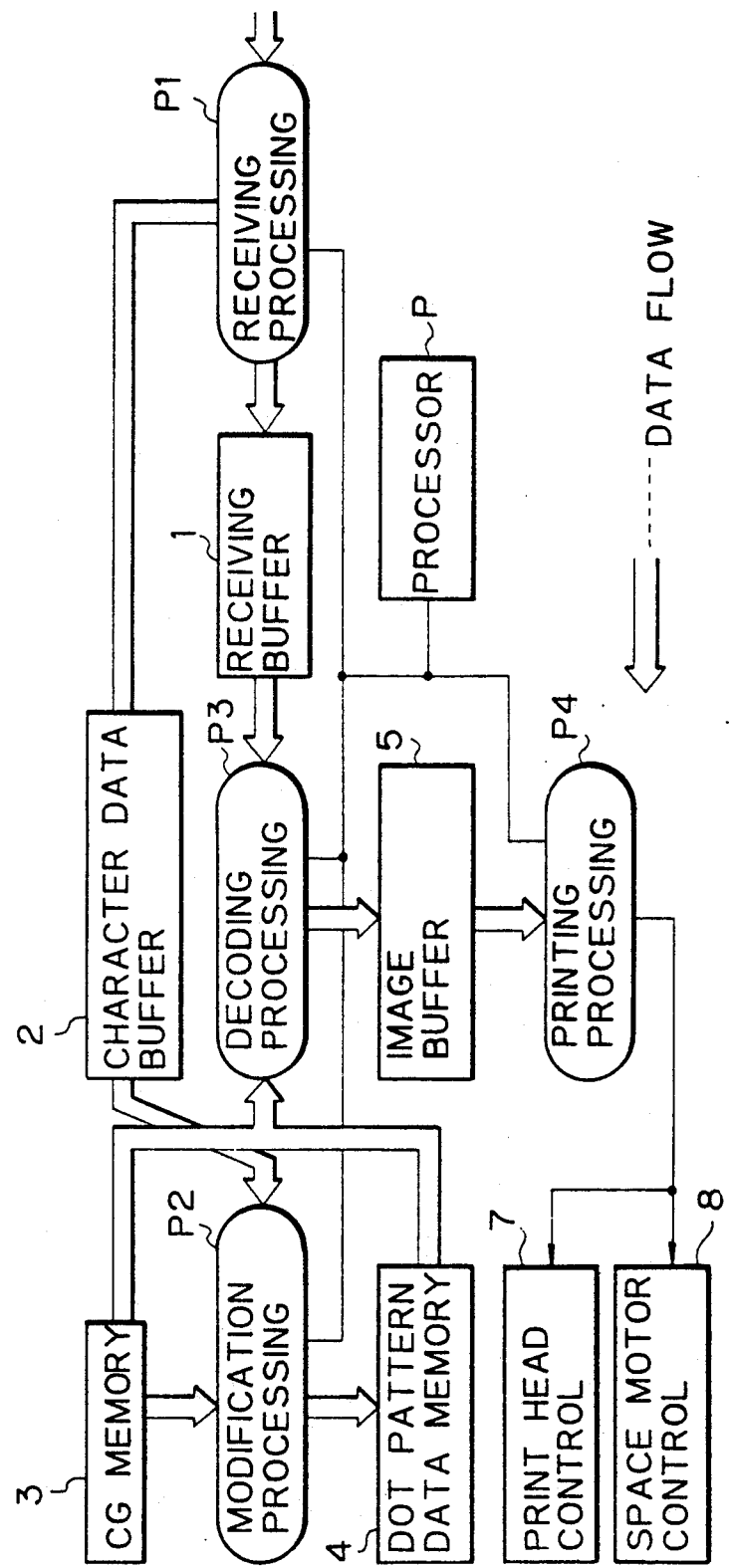
FIG. 1 is a diagram showing data flow in a control apparatus of a high speed/high quality printer according to the present invention.

FIG. 1 is a diagram used for explanation of data flow and processings in an embodiment of a control apparatus of a high speed/high quality printer according to the present invention.

Figure 2:
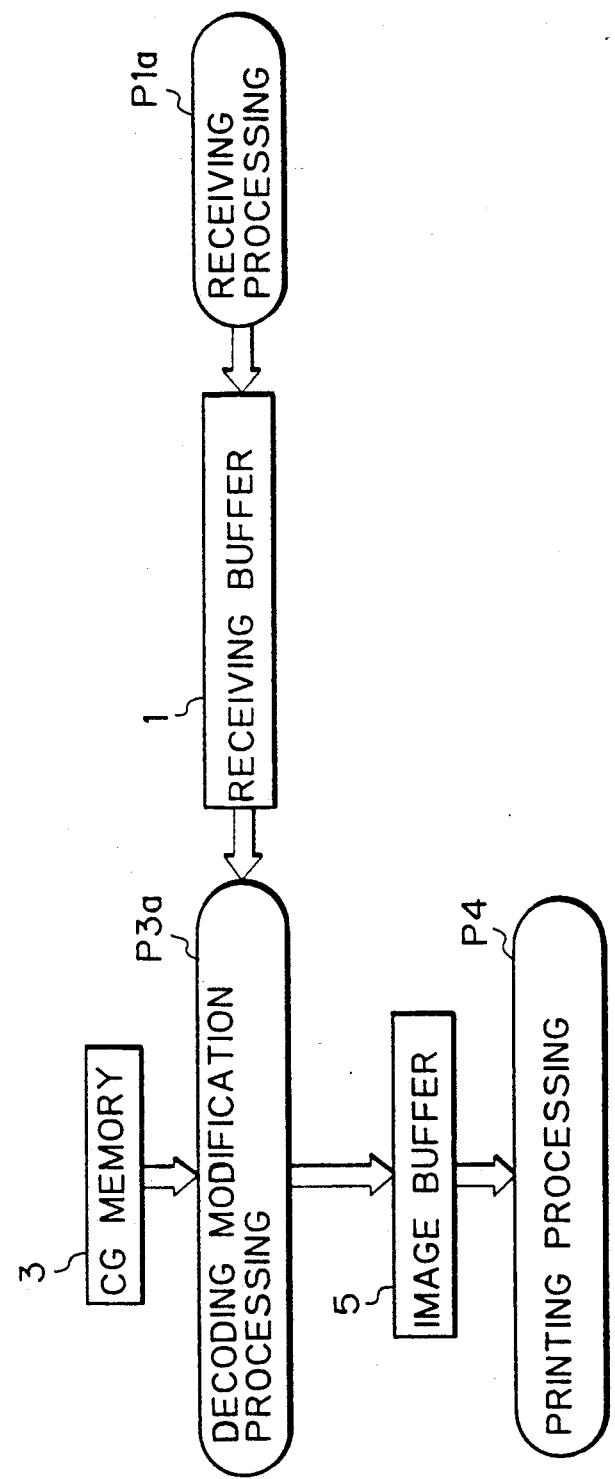
FIG. 2 is a diagram showing data flow in a control apparatus of a high speed/high quality printer according to the prior art.
Figure 3A:
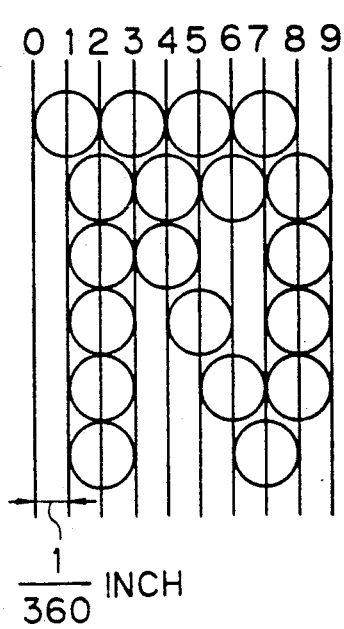
FIGS. 3A, 3B and 3C are diagrams used for the explanation of a procedure of the enlargement of a character, respectively.
Figure 3B:
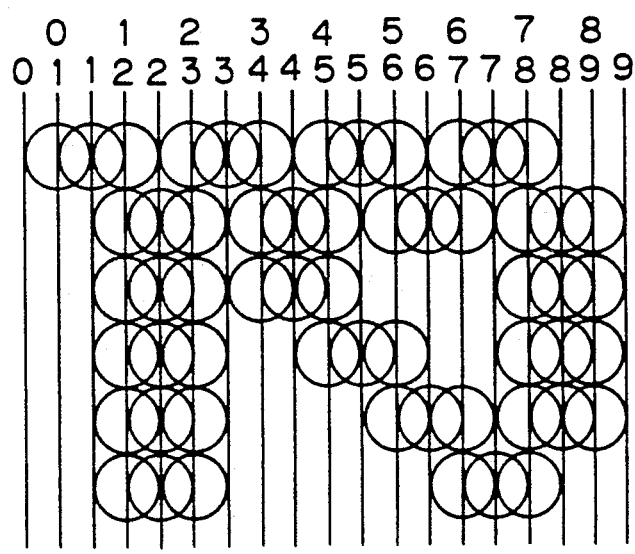
Figure 3C:
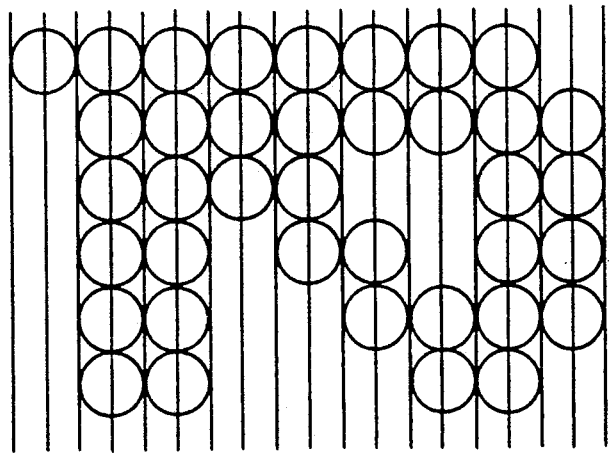

The apparatus shown in FIG. 1 is provided with a receiving buffer 1, a modification character buffer or character data buffer 2, CG (Character Generator) memory 3, a modification pattern memory or dot pattern memory 4 and an image buffer 5. The reiving buffer 1, CG memory 3 and the image buffer 5 may be the same ones shown in FIG. 2 as the prior art, respectively, and thus the explanation thereof will be omitted.

The modification character buffer 2 comprises RAM (Random Access Memory) etc., and temporarily stores data which needs a modification processing to provide a high quality of character. The modification pattern memory 4 comprises RAM etc., and temporarily stores dot pattern data subjected to the modification processing.

A receiving processing P1, a modification processing P2, a decoding processing P3 and a printing processing P4 are performed in accordance with program flows shown in FIGS. 5A, 5B and 5C. A processor P for carrying out those programs serves as a receiving processing means, a modification processing means, a decoding processing means and a printing processing means.

In the receiving processing P1, the data received from a host system is stored in the reiving buffer 1. Further it is determined as to whether the received data is the character data which needs the modification processing, and if necessary one, the received data is transferred and stored in the modification character buffer 2 prior to a printing processing.

In the modification processing P2, dot pattern data corresponding to the data stored in the modification character buffer 2 is read out from CG memory 3 and in turn subjected to the modification processing, and the thus processed data is stored in the modification pattern memory 4. This modification processing P2 is carried out during an idle period of time in the printing processing.

In the decoding processing P3, dot pattern data corresponding to the character data stored in the receiving buffer 1 is read out from CG memory 3 to be stored in the image buffer 5. However, in a case where the received data needs the modification processing, the dot pattern data, which has been stored in the modification processing P2, is read out from modification pattern memory unit 4 and stored in the image buffer 5. In the printing processing P4, the dot pattern data stored in the image buffer 5 is read out therefrom on a column basis for the printing processing. The printing processing P4 controls on the basis of the thus read-out dot pattern data a print head control 7 and a space motor control 8, which in tern drive a print head and a space motor, not shown, of the present apparatus, respectively, to print a character represented by the dot pattern data on a recording sheet, not shown also.

FIGS. 5A, 5B and 5C are flow charts used for the explanation of a procedure of the printing in the control apparatus of the printer according to the present invention. After power is turned on to be supplied to the printer, an initializing processing is performed (step S1), and receiving of data is waited for (step S2). Receipt of data enables a receiving interruption to be operative so as to perform the receiving processing P1 (step S11). In the receiving processing P1, data is stored in receiving buffer 1. At that time, a discrimination result of step S2 becomes "no". Further, in the receiving processing P1, if the modification is determined to be required, the data is then stored also in the modification character buffer 2.

Next, it is determined whether or not the modification character buffer 2 is empty (step S3), and if not empty, then the modification processing P2 is performed (step S5). In the modification processing P2, first, character data stored in the modification character buffer 2 is interpreted to read out dot pattern data corresponding to the character data from CG memory 3. Thereafter, the modification processings similar or identical to those already described with reference to FIGS. 3A, 3B and 3C, and 4 are performed. Further the modification processing for providing a high quality of character is also performed. The dot pattern data resultant from those modifications is stored in the modification pattern memory 4. If there is no designation of the modification for the character in the received data, the modification processing passes through step S5 without performing any modification processings.

Next, determination is made as to whether printing is now being performed (step S4), in other words, as to whether printing driving is performed, at step S7 which will be described after.

When a determination result at step S4 is "no", it is determined whether or not the image buffer 5 is filled with the data (step S6), and if no, the decoding processing P3 is performed (step S8). In the decoding processing P3, character data stored in the receiving buffer 1 is interpreted to read out dot pattern data corresponding to the character data from CG memory 3, and the thus read out dot pattern data is stored in the image buffer 5. In this decoding processing P3, if there is designation of the modification for the character in the data stored in the receiving buffer 1, since dot pattern data, which has been subjected to the modification processing at step S5, is stored in the modification pattern memory 4, then the dot pattern data is read out from the modification pattern memory 4 and then stored in the image buffer 5.

When a determination result at step S6 is "yes", the printing driving is performed (step S7). Thus, as shown in FIG. 6A, the printing processing P4 is performed at a time interval T (step S12). In the printing processing P4, the dot pattern data stored in the image buffer 5 is read out to print head control 7 and space motor control 8. Both of the controls drive the print head and the space motor, not shown, respectively, of the printer to print a character represented by the dot pattern data on a printing sheet.

FIGS. 6A and 6B show a timing relation between printing and a printing processing. The printing processing P4 is such a processing that the dot pattern data stored in the image buffer 5 is read out therefrom on a column basis and transferred to a printing head, not shown, of the printer. The printing head performs a column of printing at the predetermined time interval T.

A column of dot pattern to be printed with the printing head is required to be already transmitted, at a timing before the printing, by the printing processing P4 which is to be performed. For instance, in a first printing processing, a column of dot pattern data is transferred taking by time t0. After an idle period of time a0 elapsed, a printing is carried out by the printing head in a second printing timin following the first one. Accordingly, a printing processing time tx (x=0-n) is naturally shorter than the period T for printing interruption. The idle time period a0 is a idle time during which it is possible to perform other processings.

When a determination result at step S4 is "yes", in other words, when the printing is being performed, it is so programed to return to step S2. After the printing processing step S12 is terminated, for example, taking by time t0, steps S2, S3 and S5 are immediately carried out using the idle time a0, so that there is performed the modification processing P3 for the character data previously stored in the modification character buffer 2. That is, there is provided such a control that dot pattern data, which are to be next printed, are produced in the modification pattern memory 4, utilizing the total (a0+a1+ ... +an−1+an) of the idle times when printing of dot pattern data in the image buffer 5 is performed. Thus, when the printing of the dot pattern data in the image buffer 5 is terminated and the next printing is started, the dot pattern data, which has been already subjected to the modification processing P2, is prepared in the modification pattern memory 4. Accordingly, the decoding processing P3 need not provide the modification processing, it is sufficient for the decoding processing P3 simply to transfer the dot pattern data in the modification pattern memory 4 to the image buffer 5. Therefore, according to the present invention, it is possible to avoid such a matter that the modification processing is performed immediately before printing and thus to improve the processing capability of the printer.

As explained in the foregoing, the control apparatus of the high speed/high quality printer according to the present embodiment is featured by previously reading out character data which will need the modification when printing, performing the modification processing for the character data during idle time periods of the printing processing, and preparing the dot pattern data subjected to the modification processing on a predetermined memory device, and is therefore capable of performing the modification processing in parallel with the printing processing and thus preventing the printing processing from being delayed owing to the modification processing, thereby improving the processing ability of the printer.

Although the illustrative embodiment described above relates to a printer control where the modification processing is performed for the dot pattern data corresponding to the usual character data, the present invention is not to be restricted by this embodiment, and is also applicable to a printer control where data, which are compressed in dot pattern for printing in order to save a memory capacity of the memory device, are to be developed for printing. Particularly, even in a case where a compression factor of the compressed data is higher and thus it takes much more time for the developing processing, it is possible to complete the processing of developing the compressed data prior to the printing processing, thereby improving the processing ability of the printer.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A control apparatus of a high speed/high quality printer comprising:

a character data buffer for storing character data which needs a modification processing for providing a high quality of character;

dot pattern data memory means for storing dot pattern data subjected to the modification processing;

receiving processing means for providing such a processing that it is determined whether received character data is the character data which needs the modification processing, and if necessary one, the received character data is stored in said character data buffer prior to a printing processing;

printing processing means for print-processing the data stored in said dot pattern data memory means; and data processing means for providing such a processing that during an idle period of time of the processing by said printing processing means, the character data stored in said character data buffer is subjected to the modification processing, and the thus processed data is stored in said dot pattern data memory means.

2. An apparatus according to claim 1, wherein said modification processing includes a processing for performing a modification such as an enlargement of a letter or character to a dot pattern of the letter or character to be printed.

3. An apparatus according to claim 1, wherein said modification processing includes a processing for performing a modification such as an italicization of a letter or character to a dot pattern of the letter or character to be printed.

4. An apparatus according to claim 3, wherein said modification processing includes a processing for performing a modification such as a compression of the italicized character, an enlargement of the italicized character and compression of the enlarged italicized character.

5. An apparatus according to claim 1, wherein said character data buffer includes a random access memory, and is adapted to temporarily store data which needs the modification processing.

6. An apparatus according to claim 1, wherein said dot pattern data memory means includes a random access memory, and is adapted to temporarily store dot pattern data subjected to the modification processing.

7. A control device of a high speed/high quality printer comprising:

a data buffer for storing data which needs a development processing for developing compressed data;

dot pattern data memory means for storing dot pattern data subjected to the development processing;

receiving processing means for providing such a processing that it is determined whether received data is the data which needs the development processing, and if necessary one, the received data is stored in said data buffer prior to a printing processing;

printing processing means for print-processing the data stored in said dot pattern data memory means; and data processing means for providing such a processing that during an idle period of time of the processing by said printing processing means, the data stored in said data buffer is subjected to the development processing, and the thus processed data is stored in said dot pattern data memory means.

8. A control device of a high speed/high quality printer comprising:

a data buffer for storing data which needs a data processing;

data memory means for storing data subjected to the data processing;

receiving processing means for providing such a processing that it is determined whether received data is the data which needs the data processing, and if necessary one, the received data is stored in said data buffer prior to a printing processing;

printing processing means for print-processing the data stored in said data memory means; and data processing means for providing such a processing that during an idle period of time of the processing by said printing processing means, the data stored in said data buffer is subjected to the data processing, and the thus processed data is stored in said data memory means.

* * * * *